Jan. 13, 1970   L. E. KILMARX ET AL   3,489,167
TIRE PRESSURE INDICATOR
Filed Oct. 5, 1967   2 Sheets-Sheet 1

INVENTOR.
LOUIS E. KILMARX
RICHARD E. BROWN
BY Dallett Hoopes
ATTORNEY.

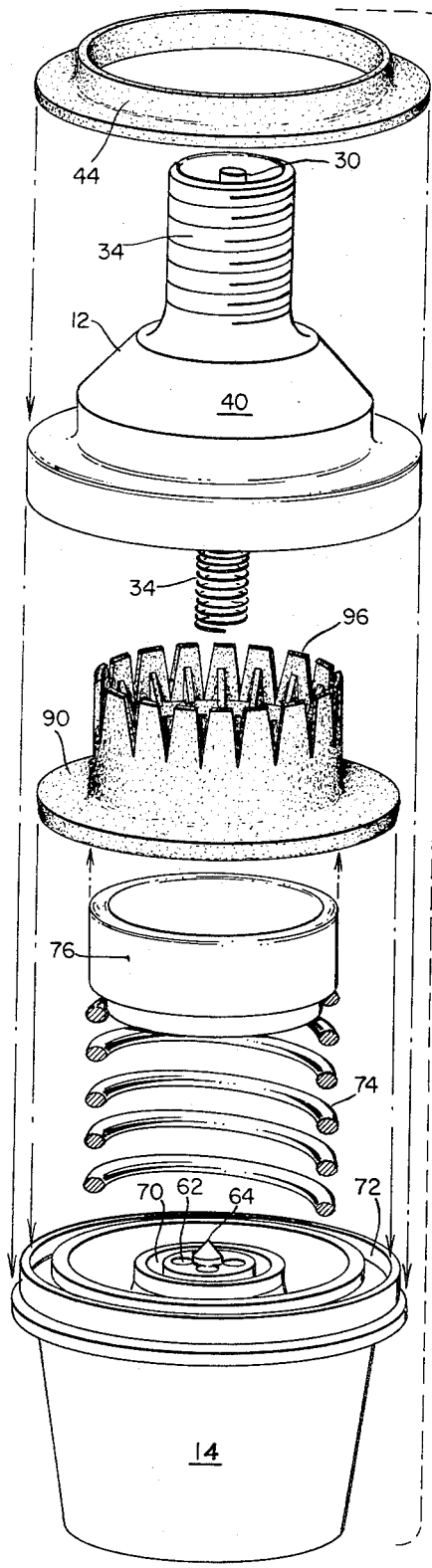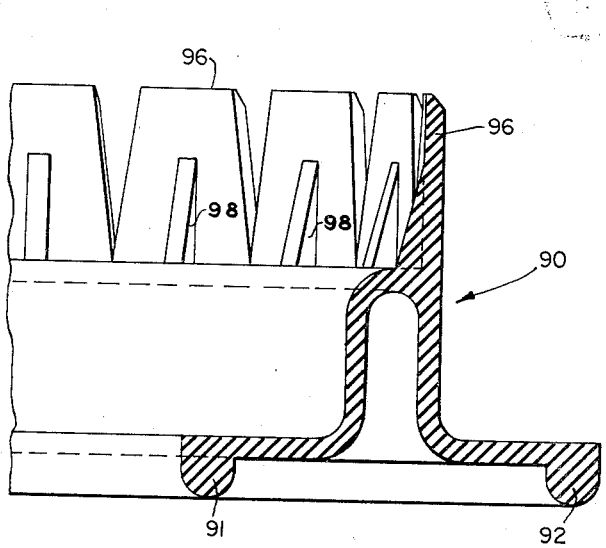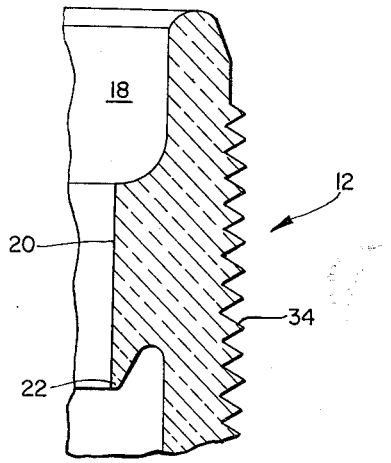
INVENTORS.
LOUIS E. KILMARX
RICHARD E. BROWN
ATTORNEY.

United States Patent Office 3,489,167
Patented Jan. 13, 1970

3,489,167
TIRE PRESSURE INDICATOR
Louis Edward Kilmarx, Dickson, and Richard Edward Brown, Franklin, Tenn., assignors to Scovill Manufacturing Company, Waterbury, Conn., a corporation of Connecticut
Filed Oct. 5, 1967, Ser. No. 673,072
Int. Cl. B60c 23/04, 29/00; F16k 15/20
U.S. Cl. 137—227
6 Claims

ABSTRACT OF THE DISCLOSURE

A tire pressure indicator which can be screwed onto the regular valve stem and provides a fill nipple. A biased diaphragm inside the indicator flexes at low pressure to show petals through a window immediately surrounding the fill nipple.

---

This invention relates to a tire pressure indicator. More specifically, this invention relates to a tire pressure indicator which will give a visual signal when the air pressure in the tire falls below a certain preset minimum pressure.

The prior art is replete with all sorts of pressure indicating devices for use with automobile tires. Most of these devices are complicated and have been unreliable. The bulk of them require the removal of the indicator to fill or release air from the tire. They have been expensive to manufacture.

The present invention relates to a tire pressure indicator adapted to fit onto the tire stem of a conventional tube or tubeless tire and to communicate with the air inside the tire. Additionally, the indicator is equipped with a fill nipple whereby the tire may be filled or air let out without removal of the indicator. The present indicator provides a reliable and readily visible indicating signal and is of simple and inexpensive construction.

Other features of the invention will be apparent from the following specification wherein:

FIG. 5 is an enlarged exploded view of an indicator embodying the invention;

FIG. 6 is a greatly enlarged sectional view taken on a radial plane through one side of the diaphragm; and FIG. 7 is a greatly enlarged sectional view taken on a radial plane and showing a portion of the valve seat in the fill nipple of an indicator embodying the invention.

Figure 1:
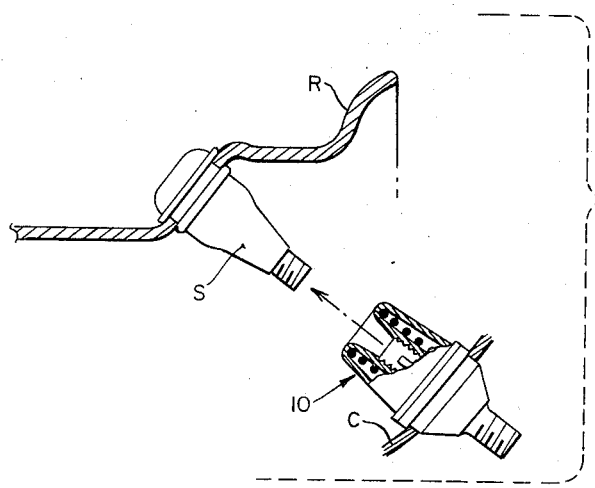
FIG. 1 shows an indicator embodying the invention adjacent the tire stem and rim of an automobile wheel.
Figure 3:
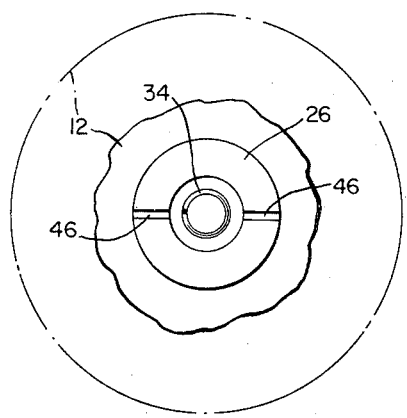
FIG. 3 is a sectional view taken on the line 3—3 of FIG. 2.

Referring more specifically to the drawings an indicator embodying the invention is generally designated 10 in FIG. 1. It is shown aligned with the tire stem S of a conventional tubeless tire having the rim R. A portion of a wheel cover C which may be used in association with an indicator embodying the invention is also shown.

Figure 2:
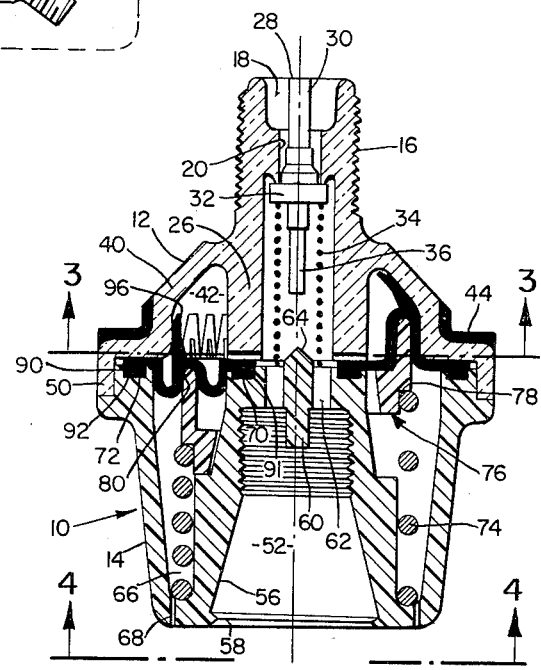
FIG. 2 is an enlarged sectional view taken through the centerline of an indicator embodying the invention and in which the left-hand side of the section shows the diaphragm as it would be connected to a tire having sufficient air pressure, while the right-hand side of FIG. 2 shows the diaphragm as it would be disposed when the indicator is connected to a tire having low tire pressure.
Figure 4:
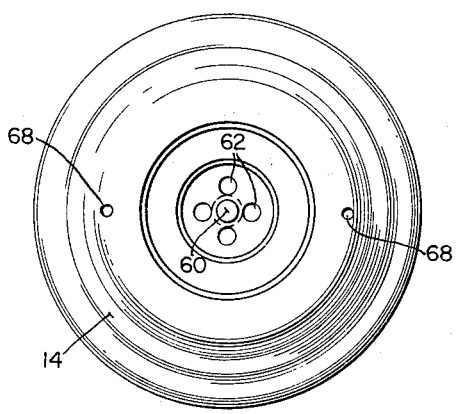
FIG. 4 is a sectional view taken on the line 4—4 of FIG. 2.

Referring now to FIG. 2, the indicator embodying the invention comprises a housing having an upper end 12 and a lower end 14. In the embodiment shown the housing is, roughly, acorn-shape. More scientifically, the housing has the shape of a surface of revolution about the axis of the housing. The upper end of the housing terminates upwardly in a fill nipple 16 which is on the axis of the housing, is threaded and is adapted to receive a standard fill cap. Inside the nipple is a central passage 18 which narrows as at 20 and presents a downwardly depending sharp annular shoulder or seat 22 (FIG. 7). Therebelow, the nipple passage widens and is defined by an annular depending wall 26. The lower end of the annular wall 26 is formed with radial slots 46 for reasons which will also appear.

A fill check valve 28 having an actuating stem 30 which protrudes upwardly in the passage 18 is also provided. Valve 28, which may be a standard valve core pin, has the annular central enlargement 32 which is engaged on its lower side by the axial spring 34 and is pressed upwardly so that its upper surface seats on the sharp annular shoulder 22 of FIG. 7. Above the annular enlargement 32 comprising the valve proper, the actuating stem 30 is stepped outward to form guide surfaces which direct the proper seating of the valve element. A central downward projection 36 helps hold the axial spring 34 in proper position.

The upper end of the housing is made of a clear plastic such as Lexan and an annular window 40 provides a view into the annular indicator chamber 42 which surrounds the depending wall 26. An elastomeric gasket 44, of L-shape section, is secured about the periphery of the upper end as shown. This serves the dual purpose of providing a rattle-reducing cushion between the indicator 10 and the wheel disc or cover, and also causes a section of the clear plastic upper end 12 to be non-transparent. An annular depending flange 50 is formed on the upper end below the collar.

The lower end 14 has in its bottom wall a central upward recess with an opening 52 which is threaded to receive the threaded end of a valve stem. The opening is on the axis of the housing. The recess is tapered toward the threaded opening as at 56 to accommodate the conventional tire stem S and has an annular inward flange 58 which may sealingly engage the rubber of the stem S. Depending centrally from the opening 52 is a valve-core-pin-engaging projection 60 adapted when the indicator 10 is mounted on a stem S to depress the conventional valve core or other valve already in the stem to hold it open. A plurality of holes 62 are disposed about the projection 60 and communicate with the nipple passage 18. A central upward point 64 positions the lower end of spring 34.

Disposed in the lower end 14 about the opening 52 is an annular well 66 which is formed with drain openings 68 to permit the venting to atmosphere of the air below the diaphragm.

Inner and outer lands are provided on the upper surface of the lower end inside and outside of the well. The lands are formed with annular grooves as at 70 and 72. An axial spring 74 is disposed in the well and rests on the bottom thereof. On the upper end of the spring is disposed a ring 76 which is formed with a shoulder 78 neatly engaging the spring. The ring extends upward to end in a blunt edge 80 intermediate the inner and outer lands. The shoulder 78 may be extended outward in an annular flange which may abut the underside of the diaphragm as in the right side of FIG. 2 to provide upper stop means. This will prevent the cramping or jamming of the petals against the window 40.

The assembly is completed by a diaphragm 90 which is annular in shape and has on its inner and outer peripheries enlarged lips 91 and 92, respectively. These lips fit into the grooves 70 and 72, respectively. In assembly the upper end 12 is brought down on the lower end 14 with the diaphragm 90 in between. The lower end of the wall 26 forces the lip 91 into sealing engagement with the inner groove 70 and the outer portion of the upper end forces the outer lip 92 into sealing engagement with its groove 72. Flange 50 is sealed to the upper periphery of the lower end 14.

Thus the indicator chamber 42 is defined by the upper end and the diaphragm 90. Access into the chamber from the nipple passage below the valve enlargement 32 is through the slots 46 so that the air pressure within the tire communicates to the inside of the indicator chamber 42.

Referring more specifically to the configration of the diaphragm 90 (FIG. 6) it will be noted that the diaphragm is molded in corrugated shape and its central upper corrugation receives the edge 80 of the ring 76. Immediately outward of the central corrugation of the diaphragm projects upwardly an annular row of petals 96 integral with the diaphragm. As shown, the petals are separated from each other by V-shaped notches and are held erect half way up their heights by triangular webs 98 also integral with the diaphragm. The petals are flexible and as shown in FIG. 2 when the diaphragm is up as under the low tire pressure the petals are pressed against the inner surface of the window 40 showing their color through the window.

The shape of the petals together is actually a development of the inner surface of the transparent window 40, so that when the diaphragm is up as in the right side of FIG. 2, the petals, inclined inwardly, form a continuous band at the windows.

When the diaphragm is in the down position as shown at the left side of FIG. 2 as when the tire pressure is sufficiently high, the petals are hidden behind the gasket 44 and do not appear through the window 40. To make the contrast more striking in the appearance of the window as between low pressure and sufficient pressure, the outside surfaces of the petals 96 may be made, for instance, red in color while the inside surfaces may be black.

It will be understood that the air pressure acting on the upper side of the diaphragm 90 is opposed by the pressure of the ring 76 engaging the underside of the diaphragm. The ring is urged upwardly by the spring 74. The spring 74 and the ring 76 thus comprise biasing means. When the air pressure is sufficient, the spring will be overcome to the extent shown on the leftward side of FIG. 2 while when the air pressure is low, the spring will dominate the force acting on the upper surface of the diaphragm 90 to raise the diaphragm, petals and all, to the position shown in the right-hand side of FIG. 2.

It should be understood that variations from the specific construction shown are possible within the scope of the present invention. For instance, it should be understood that the indicator shown and described is equally useful with tube-type tires. Further, it may be that the snap-in type mount can be incorporated directly into the lower end of the indicator with no need for threaded connections, conventional valve stems, etc. Also, the indicator can be used with an extension, between itself and the tire valve, to accommodate the various desired lengths.

Moreover, the various parts may have any of a large number of shapes and constructions and equivalents. For instance, the annular row of petals may be a continuous upstanding flange. Means may extend out into chamber 42 from wall 26 to keep the petals or such flange against the window 40, or at least from collapsing into chamber 42. Such means may make the webs 98 unnecessary. The biasing means shown, the spring 74 and ring 76 may be replaced by gas pressure permanently sealed in the chamber or well below the diaphragm. Therefore, the invention should be regarded as having the scope of the appended claims and equivalents thereof rather than the specific example above described.

What we claim is:

1. A compact tire pressure indicator adapted to be mounted on a wheel and connected to a tire and comprising a housing having a fill nipple with a central passage at its upper end and at its lower end tire connection means, a spring-pressed fill check valve disposed in the nipple passage, diaphragm means disposed across the housing and having its outer periphery sealed about the housing, the diaphragm being centrally apertured and sealed about the aperture to the tire connection means, the diaphragm defining with the upper end of the housing an indicator chamber, the upper end of the housing having an annular window immediately adjacent to and surrounding the fill nipple, said connection means and the nipple passage below the valve communicating with the chamber, the lower end of the housing enclosing biasing means urging the diaphragm means against the air pressure in the chamber and toward the window so that part of the diaphragm means is visible immediately adjacent the fill nipple when the air pressure in the chamber is below a predetermined pressure.

2. A tire pressure indicator as described in claim 1 wherein the biasing means comprises a spring disposed in an annular well in the said other end of the housing and surrounding the tire connection means.

3. A tire pressure indicator as described in claim 1 wherein the housing has the shape of a surface of revolution with the tire connection means and the fill nipple disposed on the axis.

4. A tire pressure indicator as described in claim 1 wherein the window is inclined inwardly and upwardly toward the fill nipple and the diaphragm means has an annular row of upstanding petals which engage against the inside of the window when the air pressure in the chamber is below a predetermined pressure.

5. A tire pressure indicator as described in claim 4 wherein the biasing means comprises a pressure ring engaging the diaphragm at a lesser radius than said annular row of petals and on the opposite side of the diaphragm therefrom.

6. A compact tire pressure indicator adapted to be mounted on the end of a tire stem and comprising an acorn-shaped housing having a fill nipple with a central passage at its upper end and at its lower end a threaded stem-receiving opening, a spring-pressed fill check valve disposed in the nipple passage, annular diaphragm means disposed across the housing and with the upper end of the housing defining an indicator chamber, the upper end of the housing having an annular window immediately surrounding the nipple, said opening communicating with the chamber through the central hole in the diaphragm, the nipple passage below the valve also communicating with the chamber, the lower end of the housing enclosing biasing means concentric with the opening and urging the diaphragm against the air pressure in the chamber and toward the window so that part of the diaphragm means is visible when the air pressure in the chamber is below a predetermined pressure.

References Cited

UNITED STATES PATENTS

| 2,704,045 | 3/1955 | Biesing | 116—34 |
| 3,022,795 | 2/1962 | Abrams | 137—227 |
| 3,230,968 | 1/1966 | Struby | 137—227 |

HAROLD W. WEAKLEY, Primary Examiner

U.S. Cl. X.R.

116—34; 137—557; 152—427